(12) United States Patent
Casillas

(10) Patent No.: US 12,129,012 B2
(45) Date of Patent: Oct. 29, 2024

(54) AIRCRAFT CABIN SEAL

(71) Applicant: The Boeing Company, Arlington, VA (US)

(72) Inventor: Jose Yuri Casillas, Everett, WA (US)

(73) Assignee: THE BOEING COMPANY, Arlington, VA (US)

( * ) Notice: Subject to any disclaimer, the term of this patent is extended or adjusted under 35 U.S.C. 154(b) by 31 days.

(21) Appl. No.: 18/159,170

(22) Filed: Jan. 25, 2023

(65) Prior Publication Data

US 2024/0246654 A1     Jul. 25, 2024

(51) Int. Cl.
*B64C 1/06*     (2006.01)

(52) U.S. Cl.
CPC .................... *B64C 1/066* (2013.01)

(58) Field of Classification Search
CPC . B64C 1/066; F16J 15/02; F16J 15/027; F16J 15/0893
See application file for complete search history.

(56) References Cited

U.S. PATENT DOCUMENTS

| | | | | |
|---|---|---|---|---|
| 3,778,176 A | * | 12/1973 | Pax | .......... F16J 15/027 277/645 |
| 4,741,542 A | | 5/1988 | Kimerly | |
| 11,754,185 B1 | * | 9/2023 | Whitlow | .............. F16J 15/0893 277/500 |
| 2006/0108747 A1 | * | 5/2006 | Kesseg | .................... B60J 10/80 277/650 |
| 2011/0133027 A1 | | 6/2011 | Graeber et al. | |
| 2018/0016008 A1 | * | 1/2018 | Payne | ....................... B64F 5/00 |
| 2020/0130806 A1 | | 4/2020 | Heeren | |
| 2022/0411068 A1 | | 12/2022 | Weng et al. | |

FOREIGN PATENT DOCUMENTS

| | | |
|---|---|---|
| DE | 202005019332 U1 | 2/2006 |
| EP | 0873897 A1 | 10/1998 |
| WO | 2020049295 A1 | 3/2020 |

OTHER PUBLICATIONS

EP Search Report mailed Apr. 29, 2024 in re EP Application No. 23211424.9.

* cited by examiner

*Primary Examiner* — Timothy D Collins
*Assistant Examiner* — Eric Acosta
(74) *Attorney, Agent, or Firm* — COATS & BENNETT, PLLC

(57) ABSTRACT

Resilient elongated tubular seals that are flexible and that comprise selected geometric cross-sections and that can absorb compressive forces to seal gaps between adjacently positioned aircraft cabin structure and that can further expand outwardly as compressive forces change or abate and methods of installation of such tubular seals are disclosed.

29 Claims, 8 Drawing Sheets

1

AIRCRAFT CABIN SEAL

TECHNOLOGICAL FIELD

The present disclosure relates generally to the field of gap management between adjacent structures. More specifically the present disclosure relates to the field of gap management between adjacent structures in aircraft cabin environments.

BACKGROUND

Aircraft cabins comprise an abundance of aircraft cabin structures and aircraft cabin components for aircraft cabin structures that are selected and positioned adjacent one another for purposes that can include space efficiency, ease of installation, removal, replacement, etc. In an aircraft passenger cabin, the dynamic nature of the aircraft itself during transit can cause movement of adjacently and/or proximately located cabin structures (e.g., structures positioned immediately adjacent to and/or otherwise in close relationship to one another, etc.) relative to one another during flight. In addition, part structure dimensions can include manufacturing tolerances such that gaps may be observed when parts and structures are joined together, or when parts and structures are placed in close relationship to adjacent parts and structures.

Unless explicitly identified as such, no statement herein is admitted as prior art merely by its inclusion in the Technological Field and/or Background section(s).

SUMMARY

According to a present aspect, an apparatus is disclosed with the apparatus including a tubular seal, with the tubular seal including a tubular seal wall, with the tubular seal wall defined by a tubular seal wall exterior surface and a tubular seal wall interior surface, and with the tubular seal wall interior surface including a tubular seal wall interior surface profile. The tubular seal wall interior surface profile defines a tubular seal internal cavity, with the tubular seal wall further including a tubular seal wall thickness profile. The tubular seal wall thickness profile includes a plurality of tubular seal wall first thickness regions that have a tubular seal wall first thickness, and with the tubular seal wall thickness profile further including a plurality of tubular seal wall second thickness regions that have a tubular seal wall second thickness, and wherein the tubular seal wall first thickness is greater than the tubular seal wall second thickness.

In another aspect, the tubular seal is a removable tubular seal.

In another aspect, the tubular seal is a reusable tubular seal.

In another aspect, the tubular seal wall thickness profile includes a selected pattern of tubular seal wall first thickness regions and tubular seal wall second thickness regions.

In a further aspect, the tubular seal wall exterior surface has a substantially constant radius.

In another aspect, the tubular seal wall thickness profile comprises an alternating pattern of tubular seal wall first interior regions and tubular seal wall second interior regions.

In another aspect, the tubular seal wall first thickness is greater than the tubular seal wall second thickness by a ratio ranging from about 10:1 to about 2:1.

In another aspect, the tubular seal wall first thickness is greater than the tubular seal wall second thickness by a ratio ranging from about 5:1 to about 2:1.

In a further aspect, the tubular seal comprises a variable and radial tubular seal inner wall surface profile, with the variable and radial tubular seal inner wall surface profile symmetrical along a vertical axis and is further symmetrical along a horizontal axis.

In another aspect, the tubular seal further includes a reinforcing insert, with the reinforcing insert dimensioned to fit longitudinally within a tubular seal cavity.

In another aspect, the tubular seal further includes a reinforcing insert dimensioned to fit longitudinally within the tubular seal cavity.

In another aspect, the apparatus further includes a tubular seal retaining element.

In another aspect, the tubular seal retaining element is integral with the tubular seal.

In another aspect, the tubular seal retaining element is configured to protrude a selected distance from the tubular seal wall exterior surface.

In another aspect, the tubular seal retaining element includes a recessed channel integral with the tubular seal wall exterior surface.

In a further aspect, the apparatus further includes a tubular seal retainer strip.

In a further aspect, the tubular seal retainer strip is configured to receive the tubular seal retaining element.

In another aspect, the tubular seal retainer strip is configured to engage the recessed channel integral with the tubular seal wall exterior surface.

According to a present aspect, an aircraft cabin assembly is disclosed, with the aircraft cabin assembly including a first aircraft cabin structure and a second aircraft cabin structure, with the second aircraft cabin structure positioned adjacent to and positioned a selected distance from the first aircraft cabin structure, with the first aircraft cabin structure and the second aircraft cabin structure defining a gap between said first and second aircraft cabin structures at the first aircraft cabin structure/second aircraft cabin structure interface. The aircraft cabin assembly further includes a tubular seal positioned between the first aircraft cabin structure and the second aircraft cabin structure, with the tubular seal including a tubular seal wall, with the tubular seal wall defined by a tubular seal wall exterior surface and a tubular seal wall interior surface, and with the tubular seal wall interior surface including a tubular seal wall interior surface profile. The tubular seal wall interior surface profile defines a tubular seal cavity, with the tubular seal wall further including a tubular seal wall thickness profile, with the tubular seal wall thickness profile including a plurality of tubular seal wall first thickness regions that have a tubular seal wall first thickness, with the tubular seal wall thickness profile further including a plurality of tubular seal wall second thickness regions that have a tubular seal wall second thickness, with the tubular seal wall first thickness greater than the tubular seal wall second thickness. The tubular seal further includes a tubular seal retaining element integral with the tubular seal. The aircraft cabin assembly further includes a tubular seal retainer strip configured to engage and/or removably engage the tubular seal retaining element, with the tubular seal retaining element further configured to contact at least one of the first aircraft structure and the second aircraft structure.

In another aspect, the tubular seal is a one-piece tubular seal.

In another aspect, the tubular seal wall exterior surface can have a substantially constant radius.

In another aspect, the first aircraft cabin structure includes at least one of an aircraft cabin ceiling, an aircraft cabin floor, an aircraft cabin partition, an aircraft cabin monument, an aircraft cabin lavatory wall, an aircraft cabin wall, and combinations thereof.

In another aspect, the second aircraft cabin structure includes at least one of an aircraft cabin ceiling, an aircraft cabin floor, an aircraft cabin partition, an aircraft cabin monument, an aircraft cabin lavatory wall, an aircraft cabin wall, and combinations thereof.

In another aspect, the tubular seal is a one-piece tubular seal.

In another aspect, the tubular seal wall thickness profile comprises a selected pattern of tubular seal wall first thickness regions and tubular seal wall second thickness regions.

In a further aspect, the tubular seal wall thickness profile comprises an alternating pattern of tubular seal wall first interior regions and tubular seal wall second interior regions.

In another aspect, the tubular seal includes a reinforcing insert, with the reinforcing insert dimensioned to fit longitudinally within the tubular seal cavity.

In another aspect, the tubular seal is a closeout seal.

Another present aspect discloses an aircraft comprising the presently disclosed aircraft cabin assembly.

Further present aspects disclose a method for sealing a gap adjacent an aircraft cabin structure, with the method including installing a first aircraft cabin structure into an aircraft cabin assembly, installing a second aircraft cabin structure adjacent to and at a selected distance from a first aircraft cabin structure to form a first aircraft cabin structure/second aircraft cabin structure interface in an aircraft cabin assembly. At least one of the first aircraft cabin structure and the second aircraft cabin structure include a tubular seal, with the tubular seal positioned at the first aircraft cabin structure/second aircraft cabin structure interface. The tubular seal includes a tubular seal wall, with the tubular seal wall defined by a tubular seal wall exterior surface, and a tubular seal wall interior surface. The tubular seal wall interior surface includes a tubular seal wall interior surface profile, with the tubular seal wall interior surface profile defining a tubular seal cavity. The tubular seal wall interior profile includes at least one tubular seal wall first thickness region, with the tubular seal wall first thickness region including a tubular seal wall first thickness, with the tubular seal wall interior profile further including at least one tubular seal wall second thickness region, and with the tubular seal wall second thickness region including a tubular seal wall second thickness. The tubular seal further includes a tubular seal retaining element, with the tubular seal retaining element integral with the tubular seal. The method further includes interposing the tubular seal between the first aircraft cabin structure and the second aircraft cabin structure to form a seal at the first aircraft cabin structure/second aircraft cabin structure interface, with the tubular seal wall interior profile further including a pattern of alternating tubular seal wall first thickness regions and tubular seal wall second thickness regions, with the tubular seal wall first thickness differing from the tubular seal wall second thickness.

In another aspect, the tubular seal wall first thickness is greater than the tubular seal wall second thickness.

The features, functions, and advantages that have been discussed can be achieved independently in various aspects or may be combined in yet other aspects, further details of which can be seen with reference to the following description and the drawings.

BRIEF DESCRIPTION OF THE DRAWINGS

Figure 1:
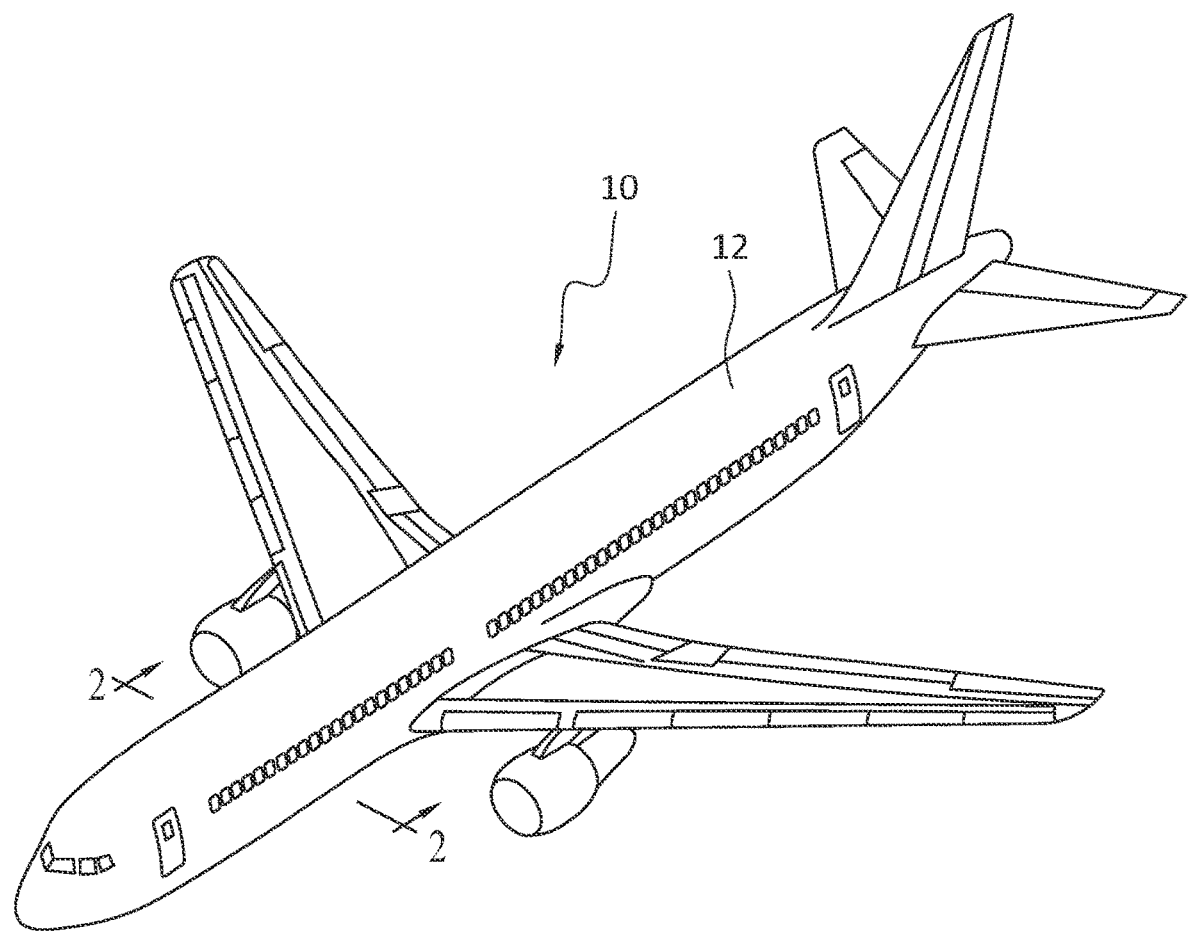
Figure 2:
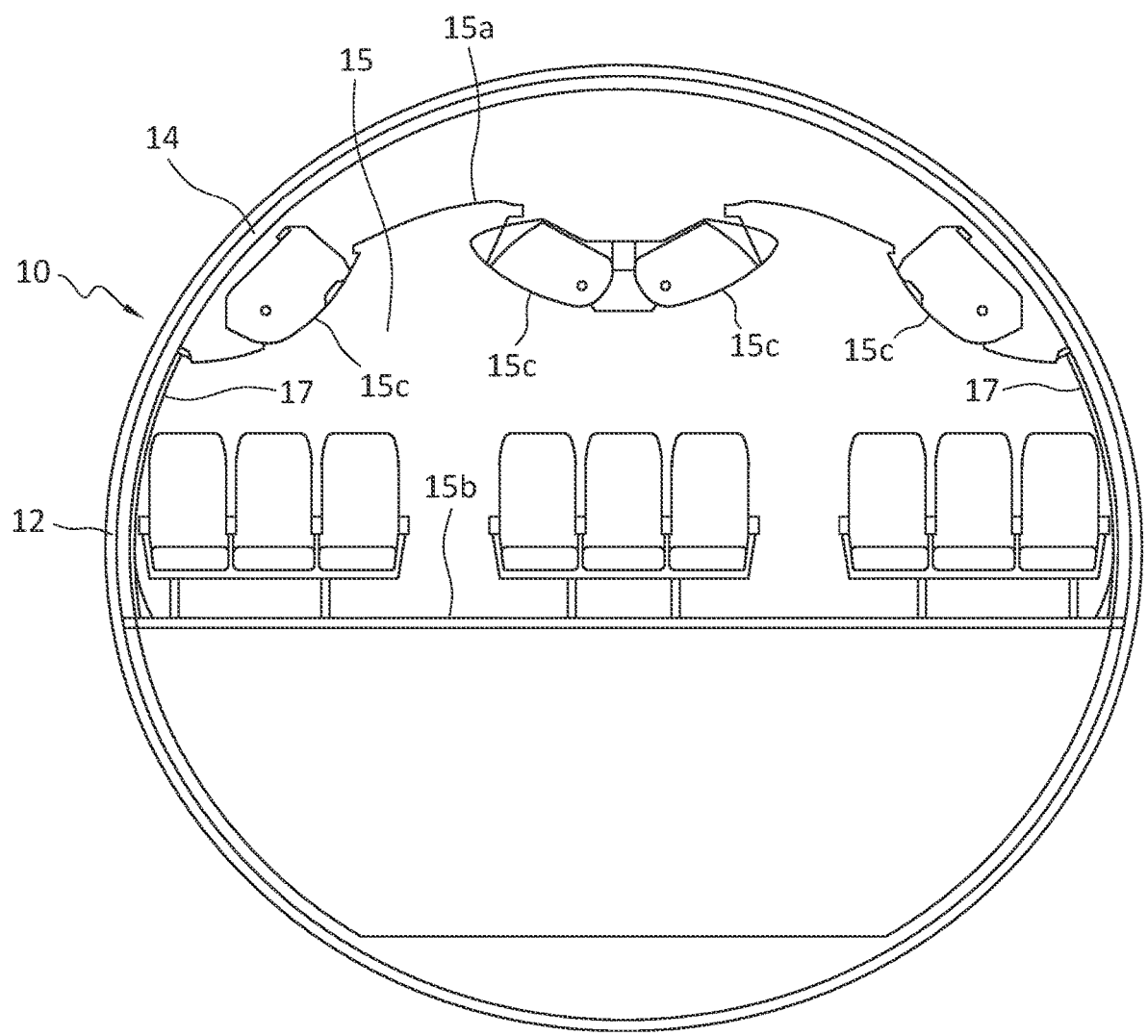
Figure 3:
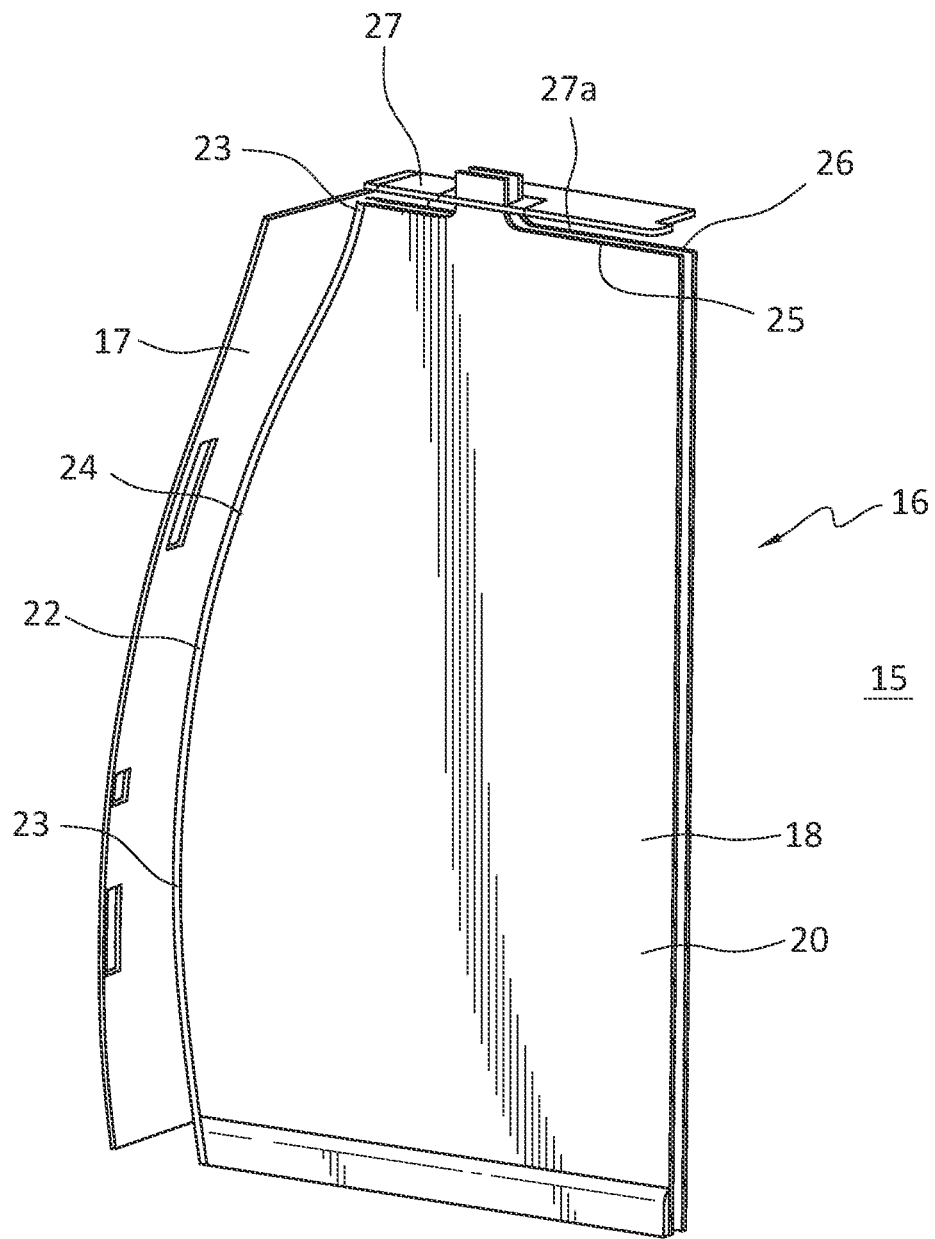
Figure 4A:
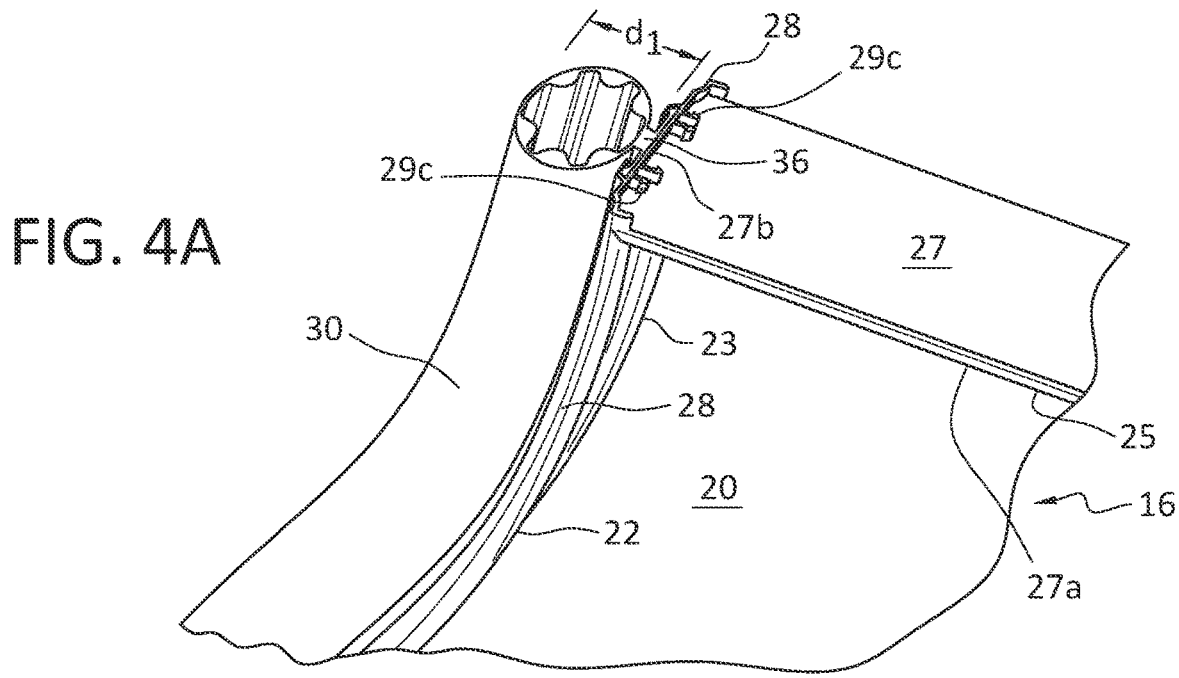
Figure 4B:
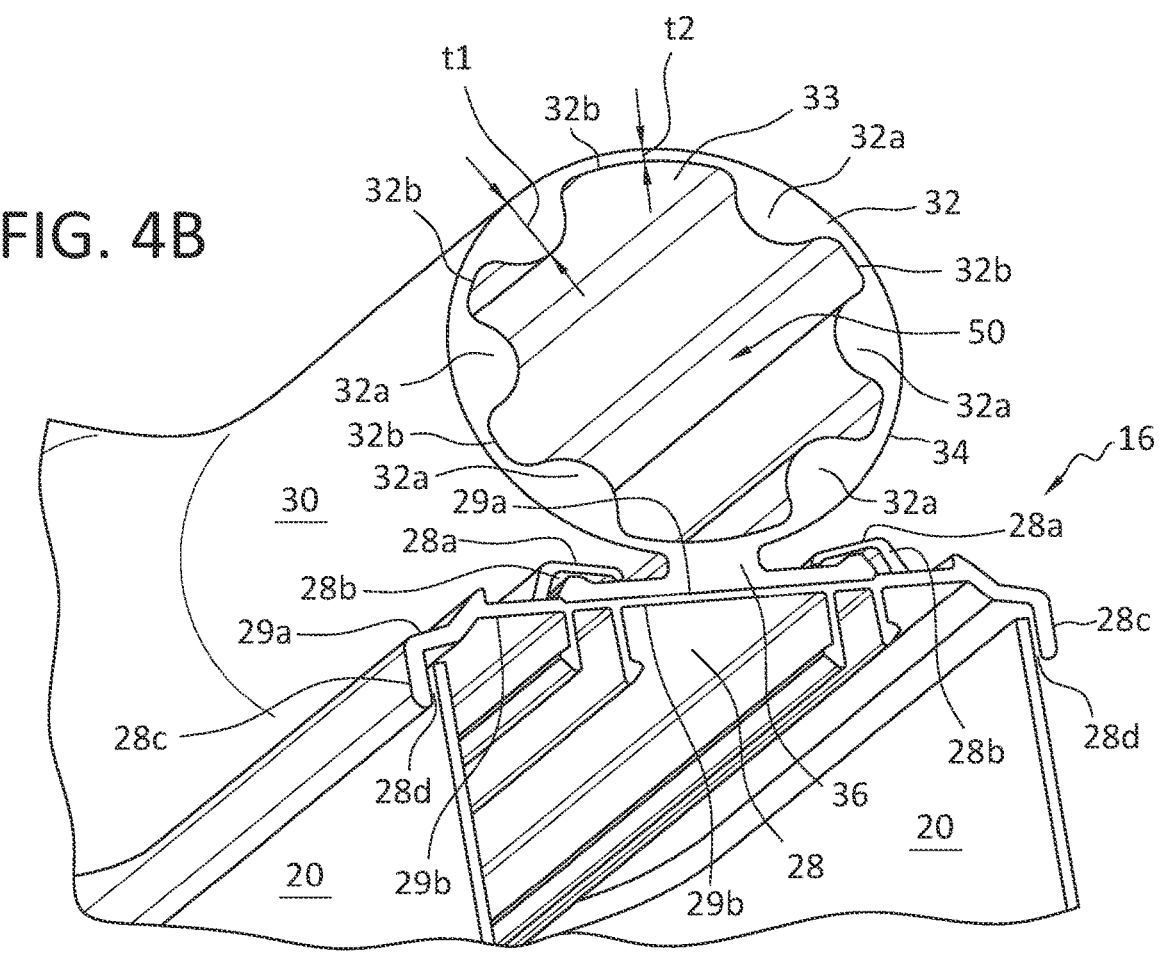
Figure 5:
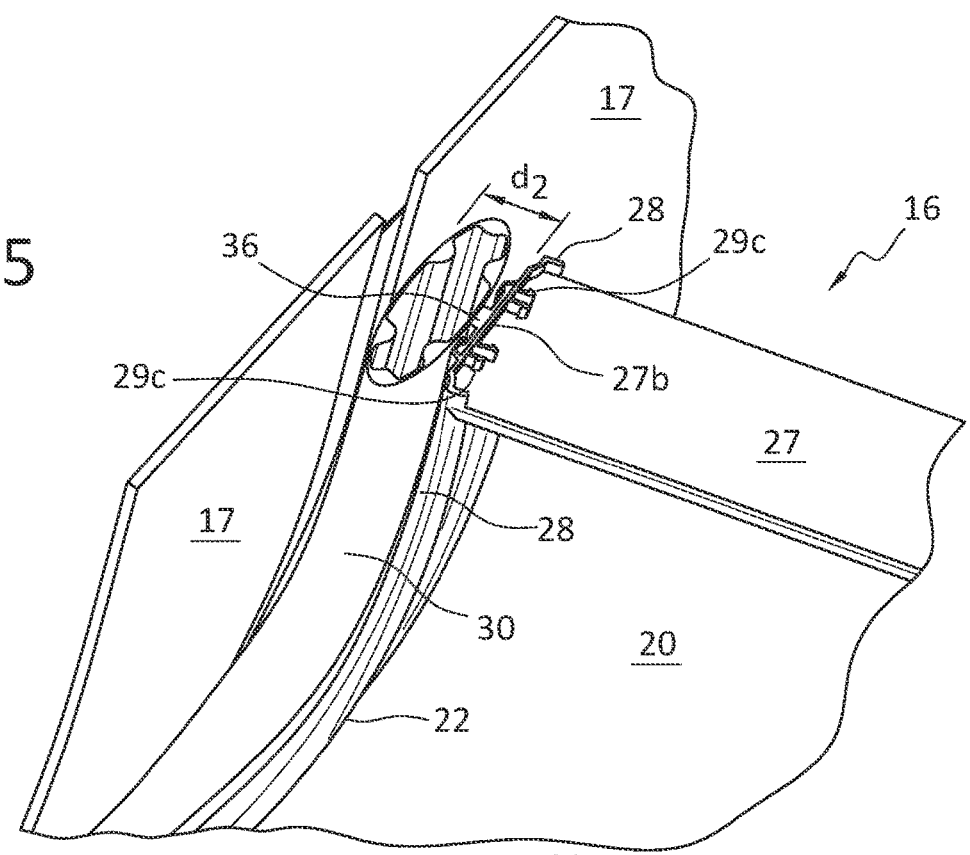
Figure 6:
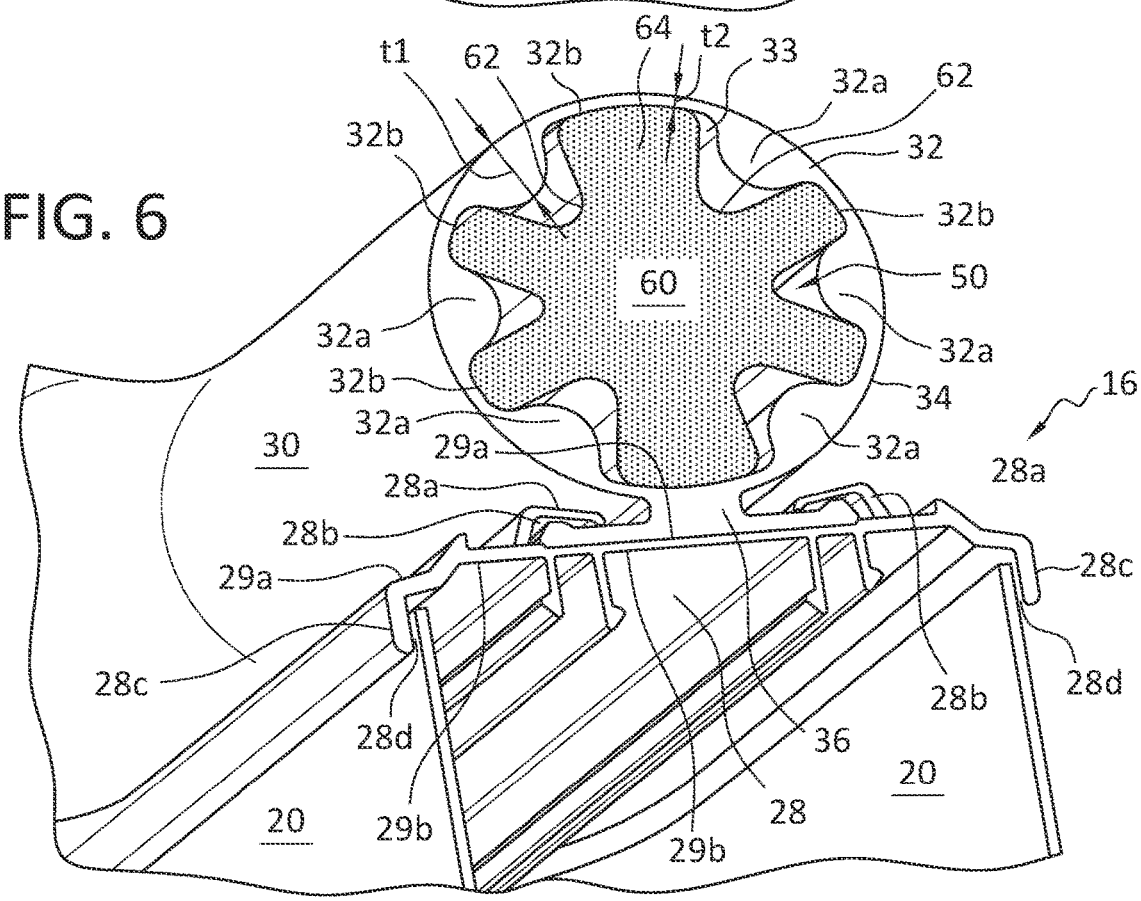
Figure 7:
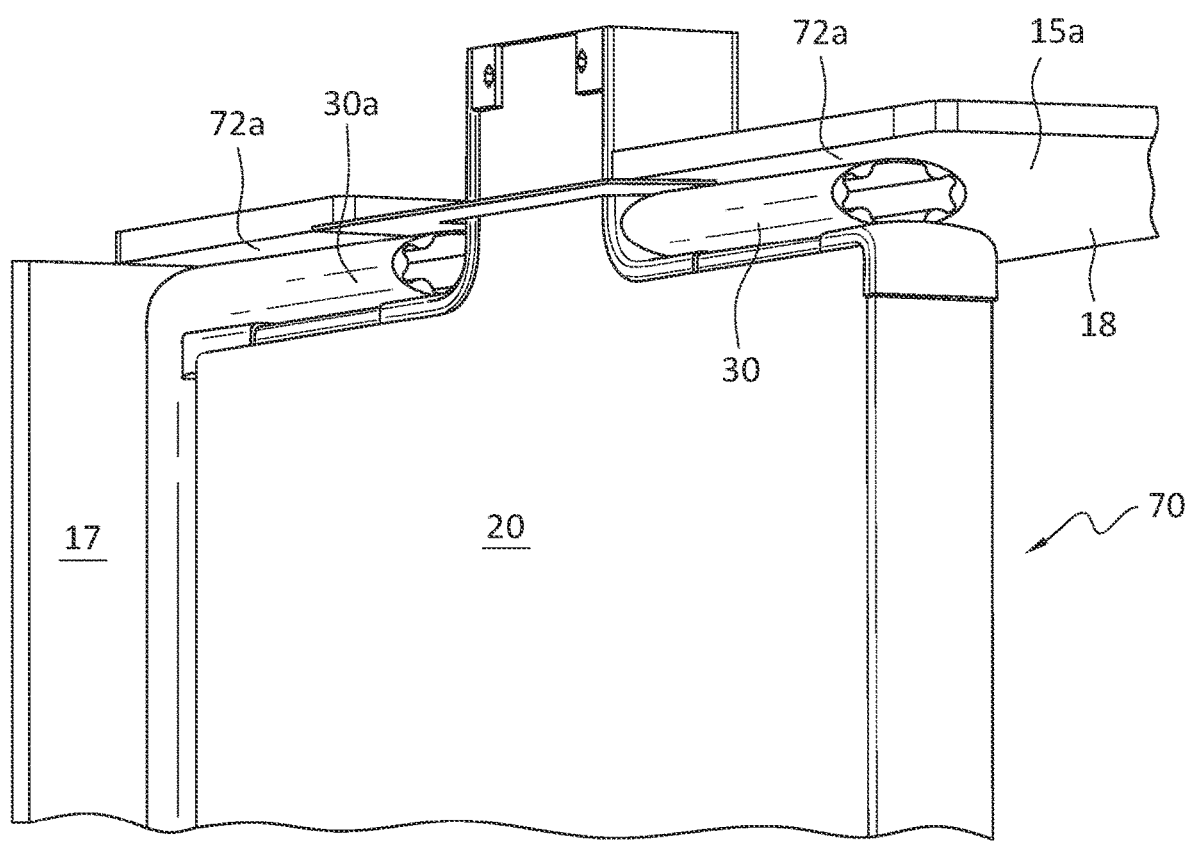
Figure 8:
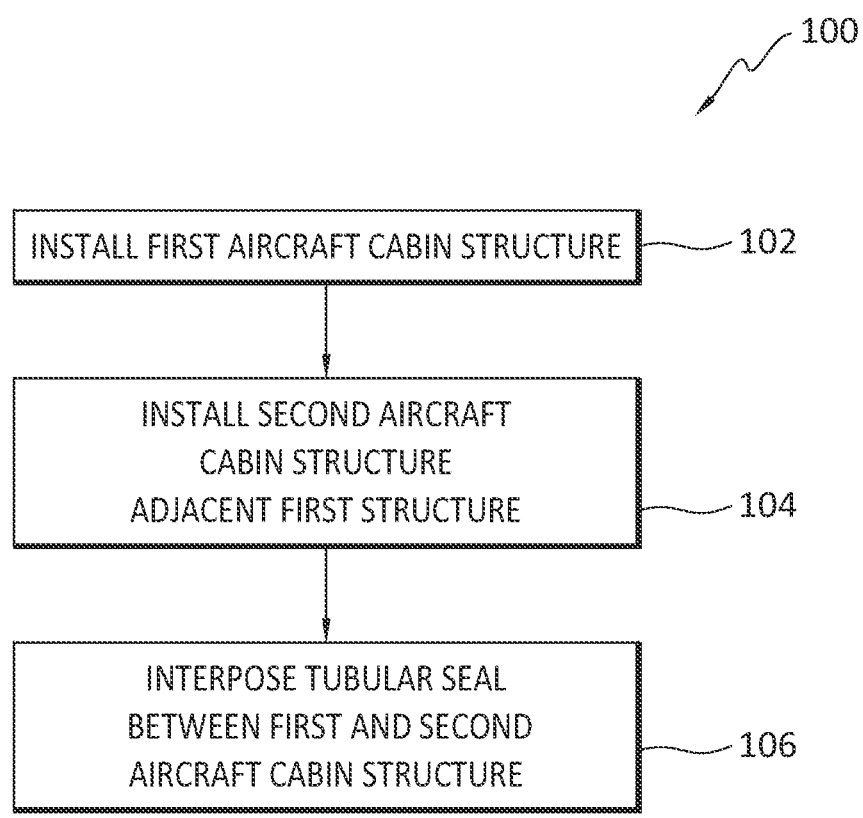

Having thus described variations of the disclosure in general terms, reference will now be made to the accompanying drawings, which are not necessarily drawn to scale, and wherein:

FIG. 1 is a perspective view of an aircraft, according to present aspects;

FIG. 2 is a cross-section view of an aircraft, according to present aspects;

FIG. 3 is a perspective view of aircraft cabin structures positioned adjacently, according to present aspects;

FIG. 4A is an enlarged partial view of an aircraft cabin structure in the form of a partition of the type shown in FIG. 3 with a tubular seal shown in place, according to present aspects;

FIG. 4B is an enlarged partial view of an aircraft cabin structure with a tubular seal shown in place, according to present aspects;

FIG. 5 is an enlarged partial view of the partition of the type shown in FIG. 3 with a tubular seal shown interposed between an outboard partition and an outboard side wall, according to present aspects;

FIG. 6 is an enlarged partial cross-sectional end view of a tubular seal in place proximate to a partition, with an insert present within the tubular seal cavity, according to present aspects;

FIG. 7 is a partial perspective view of a tubular seal in place between adjacent first and second aircraft cabin structures;

FIG. 8 is a flowchart outlining a method according to aspects; and

Figure 9:
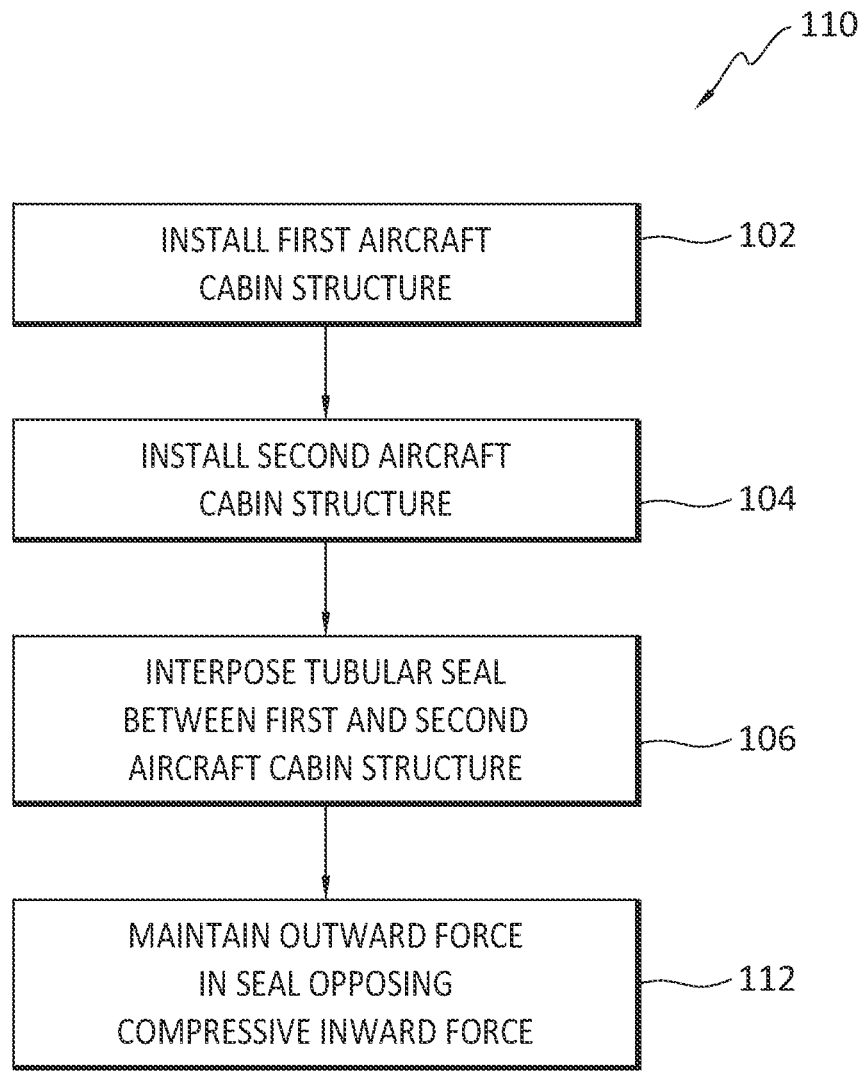

FIG. 9 is a flowchart outlining a method according to aspects.

DETAILED DESCRIPTION

During construction of aircraft cabin assemblies, component parts of the cabin assemblies that are configured to rest adjacent to one another may exhibit a gap between the parts that can, at least, frustrate the desire to inhibit light, sound, etc., from passing from one cabin area to another cabin area via the gap between adjacent component parts. Other reasons for wanting to eliminate gaps between aircraft cabin assembly components can include eliminating rattling, or other vibration, noise, etc. In addition, design and aesthetics can dictate the need for gap elimination between component parts in an aircraft cabin assembly including, for example, increasing the structural integrity (e.g., stability, etc.) of aircraft cabin structures positioned adjacent to a gap.

According to present aspects, an elongated tubular seal configured to engage with an aircraft cabin structure is disclosed, with the elongated tubular seal flexibly engaged between two aircraft cabin component parts and/or between two aircraft cabin assemblies, and/or between an aircraft cabin assembly and an aircraft cabin structure (referred to equivalently herein as "between two aircraft cabin structures"). The presently disclosed tubular seals can be installed in aircraft cabin assemblies to fill and otherwise occupy substantially completely, the gaps existing between first and second adjacently located aircraft cabin structures. The first and second aircraft cabin structures can include, for example, aircraft cabin ceilings, aircraft cabin floors, aircraft cabin monuments, storage bins, aircraft cabin partitions, aircraft cabin walls, aircraft cabin lavatory walls, etc.

According to present aspects, the elongated tubular seal is made from a flexible, resilient material that can be repeatedly compressed, that can be removable, and that can withstand a selected degree of compression when in position between adjacent aircraft cabin structures that can exert inward forces on the tubular seal. In the event that the inward compressive forces on the elongated tubular seal are not constant, or otherwise change and/or decrease during use (including, for example, during flight, etc.), the present tubular seals can move toward reestablishing an original configuration by applying outward force to take up and otherwise occupy, for example, a tubular seal original volume that is substantially equal to the volume of the tubular seal that is not in a compressed state, or that is otherwise not subject to compressive forces imposed on the tubular seal by adjacent aircraft cabin assembly component parts (referred to equivalently herein as "aircraft cabin structures"). That is, present aspects contemplate a flexible elongated tubular seal that can be fixedly and removably located between adjacent aircraft cabin structures, and that can occupy and otherwise eliminate an existing gap between such aircraft cabin structures. The contemplated presently described elongated tubular seals can sustain a selected inward compressive force without sustaining permanent dimensional damage (e.g., via crushing, etc.) and that can display a selected resiliency by expanding toward original form and original volumetric dimension when, and if, an imposed inward compressive force lessens, or is completely removed (e.g., a compressive force is no longer present, etc.).

At least through their resiliency, the presently disclosed elongated tubular seal affords a significant improvement to aircraft cabin assemblies having adjacently positioned aircraft cabin structures that have a gap between the adjacently positioned aircraft cabin structures (e.g., at a first and second aircraft cabin structure interface). The presently disclosed tubular seals more effectively and successfully fill and otherwise substantially completely occupy gaps occurring between adjacent aircraft cabin structures, and further provide a robust and resilient flexible seal along a selected length between adjacent aircraft cabin structures. In addition, the presently disclosed elongated tubular seals can be unitary (e.g., a single part seal) and reduce the need for multiple-part seals typically in use, as the present elongated tubular seals can provide an effective seal between adjacent structures that previously required the use of multiple seal parts and/or multiple seal types, including, for example, sealing parts around part corners, etc. That is, the present tubular elongated seals can be configured to bend around a part corner, while maintaining a unitary (e.g., a one-piece) seal, instead of requiring multiple-part seals to be joined together to seal adjacently positioned structures "around corners", and/or where parts and structures to be sealed exhibit a change of plane or direction that previously would not have been possible to seal with a single, linear seal, and instead previously would have required multiple seal parts having various dimensions and angles, etc. to be joined together to effect a desired seal along the entire length (e.g., an exposed facing perimeter that may include a curve or otherwise have an altered plane, etc.) of regularly or irregularly dimensioned structures.

The ability afforded by the presently disclosed elongated and flexible tubular seals to provide a one-piece seal for use in sealing adjacent aircraft cabin assemblies, significantly reduces the number of different parts previously required for installing aircraft cabin assemblies. Further, the reduction in the number of discrete seal parts required to accomplish an aircraft cabin assembly installation into an aircraft significantly reduces the inventory of parts required to be kept on hand, etc.

According to present aspects, "male" seal retainers that are integral with or otherwise associated with (and that can protrude from and otherwise form a portion of the tubular seal exterior surface) the elongated tubular seals are configured to engage complementary "female" channels and/or recesses provided in at least one aircraft cabin component (e.g., a presently disclosed seal retainer or seal retainer strip described more fully herein) that is positioned adjacent a gap to be sealed by the presently disclosed elongated tubular seals. Further, according to present aspects, the elongated tubular seals can comprise an integral "female" recess or channel along a region of the exterior surface of the tubular seal such that the recess is complementary to and that can engage with a "male" retaining feature (e.g., a presently disclosed seal retainer or seal retainer strip) that can be provided on at least one aircraft cabin structure that is adjacent a gap to be sealed by the presently disclosed elongated tubular seals.

The accompanying FIGs. are provided and described herein to further illustrate aspects of the present disclosure. FIG. 1 is a perspective view of an aircraft 10 comprising an aircraft fuselage 12, with the aircraft 10 being of the type that can comprise an aircraft cabin substantially bounded by an aircraft cabin outboard wall positioned within the aircraft fuselage interior 14 (shown in FIG. 2). The aircraft cabin can comprise aircraft cabin structures that can be aircraft cabin assemblies that can include, or that can be positioned adjacent to, for example, other aircraft cabin structures including, for example, aircraft cabin monuments, aircraft cabin ceilings, aircraft cabin floors, storage bins, partitions, etc. The adjacently positioned aircraft cabin structures further can comprise and otherwise incorporate presently disclosed tubular seals, for example, between aircraft cabin assemblies, aircraft cabin structures, etc.

FIG. 2 is a cross-sectional view of the aircraft 10 shown in FIG. 1 taken along line 2-2. As shown in FIG. 2, aircraft cabin 15 is substantially bounded by aircraft cabin ceiling 15a, aircraft cabin floor 15b, and aircraft cabin outboard wall 17 positioned within aircraft fuselage interior 14. Storage bins 15c are further shown in position fixedly attached to structural components (not shown in FIG. 2) with the storage bins 15c positioned in close proximity to sections of aircraft cabin ceiling 15a.

FIG. 3 is an enlarged view of an aircraft cabin assembly 16 of a type that can be found in the aircraft cabin 15 (shown, for example, in FIG. 2) of an aircraft 10 of the type shown, for example, in FIGS. 1 and 2. FIG. 3 shows a first aircraft cabin structure 18 in the form of a partition 20 that is shown positioned adjacent to and substantially perpendicular to an interior surface of a second aircraft cabin structure shown in the form of an aircraft cabin outboard wall 17. Partition 20 comprises a partition first end 22 positioned immediately adjacent to a first aircraft cabin structure/second aircraft structure inter4face in the form of a partition/outboard wall interface 24, with partition first end gap 23 occurring at the partition/outboard wall interface 24, and with the partition first end gap formed and bounded at the partition/outboard wall interface 24 by the partition first end 22 and the adjacent aircraft cabin wall interior 17.

FIG. 3 further shows a partition second end 25 located at the "top" of the partition 20, with the partition second end 25 shown adjacent to a partition end cap 27 to form a partition second end gap 26 between the partition second end 25 and the adjacent partition end cap 27, with the partition second end gap 26 located at a partition second end/partition end cap interface 27a.

The enumerated features shown in FIG. 3 are set forth and described to make clear useful positioning of the tubular seals of the present disclosure (e.g., into an aircraft cabin assembly 16 of the type shown in FIG. 3) between, for example, adjacently positioned first and second aircraft cabin structures and at the first and second aircraft cabin structure "interfaces" that can contain a gap at such interfaces. That is, while the tubular seals of the present disclosure are not shown in FIG. 3, according to present aspects, the presently disclosed tubular seals are intended to fill gaps between aircraft cabin structures including those that are of the type shown in FIG. 3.

For example, according to present aspects, the gaps that would otherwise exist at the partition first end gap and partition second end gap can be "sealed" by the presently disclosed elongated tubular seals. The partition first end gap 23 (as shown at least in FIGS. 4A, 4B, and 5), and the partition second end gap 26 (as shown at least in FIGS. 7 and 8) represent non-limiting examples of locations in an aircraft cabin where the presently disclosed tubular seals can be incorporated with improved sealing attributes afforded the aircraft cabin assemblies, and aircraft incorporating the aircraft cabin assemblies, etc.

FIG. 4A shows an enlarged, partial view ("downward") at a portion of the aircraft cabin assembly 16 of the type shown in FIG. 3 (without the aircraft cabin outboard wall 17 present), with an elongated tubular seal 30 of the present disclosure that can be configured, to seal gaps in adjacently positioned aircraft cabin structures and assemblies (e.g., seal gaps in adjacent first and second aircraft structures, etc.), including gaps such as the partition first end gap 23 at the partition/outboard wall interface 24 (shown in FIG. 3).

As shown in FIG. 4A, partition second end 25 of partition 20 is positioned adjacent the underside of a partition second end cap 27 to form a partition second end/partition end cap interface 27a. Partition second end cap 27, as shown in FIG. 4A, comprises a partition second end cap edge 27b. Tubular seal 30 is shown engaging tubular seal retainer strip 28 via the tubular seal integral retaining element 36, with the tubular seal retainer strip 28 further engaging partition first end 22 along the longitudinal length of the partition first end 22 of partition 20; and with tubular seal retainer strip 28 further engaging partition second end cap edge 27b of partition end cap 27. As better shown in FIG. 4B, tubular seal retainer strip 28 has a tubular seal retainer strip first side 29a that is "exposed" and a tubular seal retainer strip second side 29b.

Tubular seal 30 is shown in FIG. 4A in, an initial position of, for example, a cabin assembly installation where the tubular seal 30 has a substantially circular cross-sectional configuration, although the present tubular seals can have any selected cross-sectional geography including, for example, elliptical, circular, hexagonal, triangular, polygonal, etc. geometries. In use, (when the tubular seals are exposed to and otherwise made to endure a compressive force from adjacently positioned aircraft cabin structures) the presently disclosed tubular seals can compress to a predetermined compressed state configuration from an initial (uncompressed) cross-sectional configuration to form improved seals at and within gaps that can exist, and that are otherwise formed at interfaces between adjacent aircraft cabin structures, components, parts, assemblies, etc. (referred to equivalently herein as "between first and second aircraft cabin structures"). As shown in FIG. 4A, the tubular seal 30 is in an initial and "uncompressed" state, with tubular seal 30 attached to a tubular seal retainer strip 28 that is directly engaged to partition 20. As further shown in FIG. 4A, tubular seal 30 has a cross-sectional width across the tubular seal diameter that is shown as equivalent to a height, or distance, "d1".

FIG. 4B is a further enlarged view of a section of an aircraft assembly of the type shown in FIG. 4A. FIG. 4B shows an enlarged, partial view looking downward at a portion of the aircraft cabin assembly 16 of the type shown in FIG. 4A, with an elongated tubular seal 30 of the present disclosure that can be configured to seal gaps between adjacently positioned first and second aircraft cabin structures, including gaps such as the partition first end gap 23 at the partition/outboard wall interface 24 of the type shown, for example in FIG. 3. As shown in FIG. 4B, and with the partition second end cap edge 27b (shown in FIG. 4A) not in place in FIG. 4B, according to present aspects, FIG. 4B perhaps more clearly shows a retaining arrangement for the tubular seal 30, and further perhaps more clearly shows an integral tubular seal retaining element 36 that can be an integral part of the tubular seal 30, according to present aspects.

As shown in FIG. 4B, tubular seal 30 comprises a tubular seal wall 32 having a tubular seal wall interior surface 33 and a tubular seal wall exterior surface 34. Tubular seal wall 32 further comprises patterns (that can be an alternating pattern) of tubular seal wall first regions and tubular seal wall second regions that possess differing wall thickness between the first and second regions that alternate (and differ) between the "thicker" wall first regions 32a having a thickness "t1" and the "thinner" wall second regions 32b shown as having a thickness "t2". As used herein, the tubular seal wall first region and tubular seal wall first thickness are equivalently referred to as "first wall region" and "first wall thickness", respectively. In addition, as used herein, the tubular seal wall second region and tubular seal wall second thickness are equivalently referred to as "second wall region" and "second wall thickness", respectively. As shown in FIG. 4B, each of the wall first regions have a thickness (e.g., a tubular seal wall first thickness) that is greater than each of the second wall thicknesses (e.g., a tubular seal wall second thickness).

In a non-compressed state, when the tubular seal exterior surface 34 is essentially dimensionally uniform (e.g., the exterior, exposed tubular seal surface displays a consistent radial length along its cross-section, etc., due to the alternating regions of first and second wall region thicknesses 32a, 32b, etc.), the tubular seal interior surface includes a variable and radial inner wall surface profile, with the inner wall surface profile symmetrical along a vertical axis and is further symmetrical along a horizontal axis. As further shown in FIGS. 4A and 4B, the tubular seal interior surface 33 defines and otherwise bounds tubular seal cavity 50 that extends at least throughout and within a selected length of tubular seal 30.

According to present aspects, the tubular seal wall thickness profile can include an alternating pattern of first wall interior regions and second wall interior regions. In one example, the first wall thickness (in the first wall region) is greater than the second wall thickness (in the second wall region) by a ratio ranging from about 10:1 to about 2:1. In another example, the first wall region thickness is greater than the second wall thickness by a ratio ranging from about 5:1 to about 2:1.

The difference between the first and second wall thicknesses of the first and second wall regions can be selected and implemented into the tubular seal construction such that, as the tubular seal is impacted by compressive forces "inwardly" on the tubular seal that are presented by the adjacent aircraft cabin structures (between which the tubular seal is interposed) to the tubular seal, the tubular seal will deform from an initial cross-sectional configuration to a deformed or compressed cross-sectional configuration, and the tubular seal will deform to a selected degree of deformation.

According to present aspects, in operation of an aircraft, the inward compressive force on the tubular seal can periodically lessen due to, for example, a slight shift in the position of the adjacently positioned aircraft cabin structures than can result in an expansion of the gap between adjacently positioned structures, etc. In such instances, according to present aspects, a gap between aircraft cabin structures may increase, at least slightly, and, in such instances, the tubular seal will expand outwardly to substantially completely fill and otherwise occupy the increasingly wider gap due to, at least, 1) the resiliency of the tubular seal construction; 2) the material selection for the tubular seal construction; and 3) the variance between the first and second wall thicknesses in the first and second wall regions in the tubular seal. According to present aspects, the selected tubular seal cross-sectional profile alone and in combination with selected material properties can determine the outwardly expanding resiliency of the tubular seal to expand outwardly and to exert an outward force against the adjacently positioned aircraft cabin structures such that the gap occupied by the tubular seal remains substantially completely sealed.

Present aspects further contemplate incorporating a tubular seal retaining element 36 built into the tubular seal wall exterior surface 34 of the tubular seal 30, such that the tubular seal retaining element 36 is integral (e.g., is a unitary construction integral) with the tubular seal. That is, the tubular seal 30 can comprise a tubular seal retaining element 36 in a unitary piece (e.g., a "one-piece" tubular seal construction that comprises, integrally, the tubular seal retaining element 36). The tubular seal retaining element 36 can further be a discrete element that is added to, and that is otherwise fixedly affixed to, a region of the tubular seal wall exterior 34 of the tubular seal 30 to provide to the tubular seal with a tubular retaining element that is not integral with the tubular seal.

The tubular seal retaining element 36 is dimensioned to have, and otherwise can comprise, an outer perimeter that is dimensioned and otherwise configured to be received within one or more a tubular seal retainer strip channel 28b positioned on tubular seal retaining strip first side 29a of tubular seal retainer strip 28. As shown in FIG. 4B, tubular seal retainer strip channel 28b can be defined by one or more tubular seal retainer strip retaining elements 28a that are shown in FIG. 4B, in non-limiting fashion, as "prongs" on either side of the tubular seal retaining element 36. The tubular seal retainer strip elements 28a can be configured to extend to a selected length along the length of the tubular seal retainer strip first side 29a of the tubular seal retainer strip 28. The one or more tubular seal retainer strip elements 28a are dimensioned to fixedly receive and removably retain the tubular seal retaining element 36 of the tubular seal 30 within the tubular seal strip channel 28b.

As further illustrated in FIG. 4B, tubular seal retainer strip 28 further comprises tubular seal retainer strip flanges 28c that can engage the outer walls of partition 20 at the tubular seal retainer flange/partition interface 28d. Tubular seal retainer strip 28 can further comprises tubular seal retainer strip clips 29c (shown in FIG. 5) that can extend a selected distance away from tubular seal retainer strip second side 29b and that can engage, for example, the partition second cap 27, as shown in FIGS. 4A and 5. The tubular seal retainer strip 28 can be made from any useful, durable, and resilient material including plastics, rubbers, etc. In one example, the tubular seal retaining strip can comprise an extrudable material such as, for example, a polyetherimide that can be a rigid material that can be, for example, ULTEM™.

FIG. 5 shows an enlarged partial view of the aircraft assembly 16 of the type shown, for example, in FIGS. 3, 4A, 4B, with the tubular seal 30 of FIG. 4A and FIG. 4B now (as shown in FIG. 5) in a compressed state between first and second aircraft cabin structures. As shown in FIG. 5, the "first aircraft structure" is shown in the form of the partition 20 to which the tubular seal can be attached, and the "second aircraft cabin structure" is shown in the form of a section of the aircraft cabin outboard wall 17. As shown in FIG. 5, the presently disclosed tubular seal 30 is configured to occupy a position between partition 20 and aircraft cabin outboard wall 17, and is otherwise configured to seal a partition first end gap 23 at the partition/outboard wall interface 24 (both shown in FIG. 3).

As shown in FIG. 5, partition 20 is further positioned adjacent a partition second end cap 27. Partition second end cap 27 comprises a partition second end cap edge 27b. The tubular seal retaining element 36 of tubular seal 30 is shown engaging tubular seal retainer strip 28 with the tubular seal strip 28 further engaging partition first end 22, and with tubular seal retainer strip 28 further engaging partition second end cap edge 27b. In a compressed state (as shown in FIG. 5), such as when tubular seal 30 is interposed into a gap between structures (e.g., such that the seal is compressed along its length to fill such a gap, etc.), the tubular seal cross-section will be compressed to a height or distance, "d2", with "d2" being less than "d1" (with "d1" shown in FIG. 4A, for example).

Resilient construction of presently disclosed tubular seal can provide a durable construction that can approximate the resilience of a memory foam that can, for example, expand and "return toward" an initial or starting configuration or cross-sectional geometry once compressive forces no longer impact the seal. That is, according to present aspects, when a presently disclosed tubular seal is installed between aircraft cabin structures, a compressive force can be delivered to the seal by the adjacent aircraft cabin structures between which the tubular seal is interposed. As the tubular seal is installed between aircraft cabin structures, compressive forces from the adjacently positioned aircraft cabin structures exert a force inwardly on the tubular seal, with the tubular seal configured to absorb and deflect a portion of the compressive forces such that the tubular seal under force can deform to a pre-selected amount or degree, and can further deform to a pre-selected cross-sectional geometry that can be different from the initial cross-sectional geometry of the tubular seal that is not under a compressive force.

Unlike typical seals that may be in use, the presently disclosed tubular seals are constructed and designed to deform or compress to a pre-selected degree when a certain level of force is applied to them. In the compressed state, the tubular seals can be further securely positioned and/or fixedly attached to more completely occupy or "fill" an existing gap between aircraft cabin structure interfaces. In another aspect, the tubular seal can be removably attached and can otherwise be removable to, for example, facilitate maintenance, rework, etc. In a further aspect, the tubular seal can be reusable.

The tubular seal can be made from a resilient material that can repeatably deform under force to a pre-selected degree, and that then can expand toward a form and or geometry or dimension that can be substantially similar to the initial cross-sectional geometry and/or dimension of the tubular seal. The pattern of varying thickness regions in the interior surface profile of the tubular seals can be selected such that the tubular seal will selectively deform (e.g., selectively and resiliently partially collapse, etc.) to a selected degree as the tubular seal is exposed to or endures a compressive force inwardly upon the tubular seal (e.g., when the seal is installed and in use, etc.).

The material selected for the presently disclosed tubular seals in combination with the selected physical location and dimension of the variable wall thicknesses along the tubular seal interior profile provides the present tubular seals with a selected degree of resilience and "springiness" that allows the tubular seals to reclaim or otherwise return toward at least an approximate original or initial form, dimension, and cross-sectional geometry when compressive force is removed from the seal, or when inwardly directed compressive forces abate or otherwise change due to, for example, a shift in position of the aircraft cabin structures that surround the tubular seal. The movement, for example, during flight, etc., of the surrounding aircraft cabin structures relative to one another can change the dimension of a gap that exists at the interface of adjoining aircraft cabin structures (e.g., an initial dimension of a gap at such a structure interface, etc.). The present resilient tubular seals can expand outwardly from a compressed condition to an expanded condition to automatically expand to a degree to fill an expanding or changing gap dimension, in real time, as the outward force of the resilient tubular seals cause the dimension of the seal to return toward a less compressed condition when a compressive force on the interposed tubular seal may abate or otherwise change through, for example, a periodic dynamic movement of the surrounding adjacently positioned aircraft cabin structures during flight, etc.

According to present aspects, the resilient tubular seals can be used between any useful aircraft cabin structures for the purpose of increasing the stability of adjoining and adjacent aircraft cabin structures (e.g., eliminating rattling or shifting of the structures during flight) as well as for the purpose of providing seals having increased capacity with respect to, for example, blocking light, sound, etc., from passing between gaps that may occur between adjacent aircraft cabin structures that are positioned, for example, between aircraft passenger sections (e.g., partitions and other structures separating, for example, first class, business class, economy class, etc.)

The materials selected for use in the construction of the tubular seals can be a uniform or a heterogenous material having, for example, a Young's modulus or other rigidity value, etc., within a useful range to deliver a selected outward force to "spring" the configuration of the tubular seal outwardly and toward an original and/or an initial dimension and cross-sectional geometric form in the absence or abatement of an inward compressive force. In one example, the tubular seal can comprise a high impact and high compressive strength solid foam that can be a closed cell foam material that can include, for example, a urethane foam material, a polyvinylidene-fluoride foam material, etc.

In another example, according to present aspects, a satisfactory compressive force for polyvinylidene-fluoride foam material useful as a material for the presently discloses tubular seal can be tested according to a test as described in ASTM (American Society for Testing Methods) D 3575 (Designation) for Compression set for Polyvinylidene-Fluoride Foam—22 hours at 50% Compression with 30-40 min recovery for Grade 2.5: 17% max Compression Deflection at 25% for Grade 2.5 23 psi max. According to present aspects, compression set is a measure of a material ability to rebound after being compressed (typically 50% for foam materials) from a material's original or initial dimension (e.g., a material's initial "thickness", etc.). As some foams are compressed under elevated temperatures, a "low" compression set value is desirable, according to present aspects. A material's compression set of 0% connotes a material has completely rebounded from a compressed state toward an original or initial non-compressed state. According to present aspects, a material having or exhibiting a "high" compression set value is not desirable. A "high" compression of 100% means that the material has not rebounded from a compressed state toward an initial or original dimension in a non-compressed state.

Compression deflection is the measurement of how much force is needed to compress a material to a known percentage (typically about 25% for foams). Compression deflection can be closely related to the foam Grade or foam Type. The lower the compression deflection, the "softer" or "more pliable" or more "easily deformable" the material will be. The higher the compression deflection is for a material, the "firmer" or "less pliable" or less subject to deformation at a particular force or more "rigid" or the material will be.

The construction of the tubular seals, according to present aspects, can incorporate multiple materials used in various locations within the tubular seal. For example, the first and second wall regions can be made from the same material or can be made from different materials. Further, the first (thicker) and second (thinner) wall regions may each comprise multiple materials, and may have varying amounts (e.g., one or more layers of one or more materials and one or more material types within one or more wall regions) of multiple materials so that, for example, certain wall region thicknesses are stiffer or more or less resilient, or provide varying selected amounts of outward radial force, etc.

According to present aspects, the tubular seal is configured to withstand compressive forces imparted inwardly on the seal, (for example, during use) by the adjacently positioned aircraft cabin structures. When the compressive forces are within a selected useful range, the present tubular seals, in the absence or abatement of such compressive forces, can expand toward an original or initial tubular seal configuration, with the tubular seals comprising a requisite outward force that enables the compressed tubular seal (in the absence or abatement of a compressive force) to expand toward an original or initial dimension (e.g., a "pre-compression" dimension, etc.). Accordingly, the presently disclosed tubular seals are made from material that is selected to withstand compressive forces without crushing, rupturing, breaking, etc. the tubular seals, and with the present tubular seals comprising the capacity to retain the ability to repeatedly expand from a compressed state (as a compressive force abates, etc.) resiliently, and otherwise repeatedly deliver an outward force to "spring" outwardly back toward a cross-sectional geometry that can be close to the initial cross-sectional geometry of the tubular seal in a "pre-installation" or "new" condition.

According to one example, selected materials can be subjected to indentation force deflection tests in accordance with ASTM D 3575, or ISO 7214, at 25 percent compression deflection. A nominal deflection range with adjacent interfaces can be engineered for 0.80-1.10 inches. With respect to the reinforcing insert component of the presently disclosed tubular seals, compression et for a melamine reinforcing insert material can be described by ASTM D 3574 Test D at 50% Compression Grade 2. Compression Deflection ASTM D 3574 Test B1 at 60 Sec and 25% deflection, Grade 2: 45 lbs/50 sq in.

As with material selection for components used in aircraft, weight and cost are factors that can impact a component's usefulness on an aircraft. Further present aspects are directed to cost and weight considerations for the manufacture of the presently disclosed tubular seals. While various "memory foam" or "memory foam-type" materials can be usefully employed in the manufacture of the present tubular seals, further present aspects balance the need for material cost constraints, weight, etc., with the selected tubular seal performance.

In addition, present aspects disclose an increased flexibility in material selection and material choice by combining a tubular seal insert that is physically and geometrically dimensioned to be received within the tubular seal cavity within the tubular seal. According to present aspects, and as shown in FIG. 6, the presently disclosed tubular seal and the present aircraft cabin assemblies and aircraft cabin structures incorporating the present tubular seal of the type shown in FIGS. 4A, 4B and 5 can further incorporate a reinforcing insert 60 that can be inserted longitudinally into the tubular seal cavity 50 of the tubular seal 32.

As shown in FIG. 6, reinforcing insert 60 is cross-sectionally and geometrically dimensioned and otherwise dimensionally configured to have a reinforcing insert perimeter 62 that can substantially geometrically and dimensional match and otherwise fit within the tubular seal cavity 50 that is bounded by and otherwise defined by the tubular seal wall interior surface 33. That is, the reinforcing insert 60, as shown in FIG. 6 has a reinforcing insert perimeter 62 that substantially matches the geometry and dimension of the tubular seal wall interior surface (e.g., the tubular seal cavity wall) to substantially occupy the volume of the tubular seal cavity. Stated another way, the reinforcing insert, at least as shown in FIG. 6 comprises a variable and radial reinforcing insert perimeter profile, with the variable and radial reinforcing insert perimeter profile being symmetrical along a vertical axis and that is further symmetrical along a horizontal axis, while also substantially matching the variable and radial inner wall surface profile of the tubular seal.

The reinforcing insert 60 can be made from a material that is the same or different than the material selected for manufacture of the tubular seal. As with the tubular seal, the reinforcing insert can be designed to be robust and deformable to a degree, with the reinforcing insert made from a material that is selected such that the reinforcing insert is repeatedly deformable and expandable, with the reinforcing insert having a degree of compressibility and resilience that, in combination with the physical cross-sectional; shape of the reinforcing insert, allows the reinforcing insert to exert an outward force such that the reinforcing insert can repeatedly substantially re-establish and move toward an initial shape and dimension within the tubular seal cavity (e.g., in the absence or in the abatement of a compressive force directed inwardly by surrounding and adjacently positioned aircraft cabin structures between which the tubular seal with reinforcing insert is positioned.

As shown in FIG. 6, the reinforcing insert projections 64 can extend to contact or otherwise rest substantially immediately adjacent to the thinner wall regions 32b (referred to equivalently herein as the "second wall regions" 32b) of the tubular seal within tubular seal cavity 50. FIG. 6 shows a space between the tubular seal inner wall thicker wall regions (referred to equivalently herein as the "tubular seal wall first regions" 32a) and the outer perimeter 62 of the reinforcing insert 60. According to present aspects, the extent to which the reinforcing insert substantially completely fills the volume of the tubular seal cavity 50 can depend on the selected degree of resiliency and robustness, of the tubular seal and insert in combination, the selected degree of resiliency and robustness of the tubular seal and the insert independently, the material selected for the tubular seal, the material selected for the reinforcing insert, and other considerations.

According to present aspects, the reinforcing insert can include an alternating pattern of outward projections (reinforcing insert projections 64) along the reinforcing insert perimeter that will dimensionally correspond to and/or dimensionally closely "match" the interior regions of the tubular seal (e.g., the tubular seal cavity 50). In one example, one or more reinforcing insert projections will extend a selected distance outwardly from the body of the reinforcing insert to substantially fill the tubular seal cavity that is adjacent to the tubular seal wall second region 32b. The area or region of the reinforcing insert between the reinforcing insert projections can then fill at least a portion of the tubular seal cavity that is adjacent to the tubular seal wall first region 32a. The number and dimensions of the reinforcing insert projections can be selected and implemented into the reinforcing insert construction to complement, fortify, and otherwise contribute to the robustness and resiliency of the overall tubular seal construction such that, as the tubular seal is impacted by compressive forces "inwardly" on the tubular seal that are presented by the adjacent aircraft cabin structures (between which the tubular seal with reinforcing insert is interposed) to the tubular seal, the tubular seal with reinforcing insert will deform from an initial cross-sectional configuration to a deformed or compressed cross-sectional configuration, and will deform to a selected degree of deformation.

According to present aspects, the degree of repeated resiliency of the reinforcing insert and the outward force provided by the reinforcing insert can be relatively equivalent to the outward force and resiliency of the tubular seal. That is, the reinforcing insert can be made from a material, that can have a physical characteristic that can be further advantageously enhanced by shaping the reinforcing insert into a selected structurally advantageous geometry and that can be longitudinally and cross-sectionally dimensioned to be received within the tubular seal cavity. In one example, the reinforcing insert can comprise a foam material that can be an open or closed cell material including, for example, a melamine foam.

The presently disclosed tubular seals can be installed into locations within an aircraft cabin and in conjunction with, and as an integrated part of, aircraft cabin assemblies other than the partition/outboard wall interface location as shown in FIGS. 3, 4A, 4B, 5, 6.

As a non-limiting example of additional aircraft cabin assemblies and aircraft cabin structures within an aircraft that can be improved by incorporating the presently disclosed tubular seals, FIG. 7 shows an aircraft cabin assembly 70 (that can be an aircraft cabin assembly in an aircraft of the type shown at least in FIGS. 1 and 2) comprising a first aircraft cabin structure in the form of a partition 20, and a second aircraft cabin structure in the form of an aircraft cabin ceiling 15a (in a lowered ceiling configuration) that are positioned adjacently to one another, with the two adjacently positioned aircraft cabin structures defining a gap 72a existing between the partition 20 and the ceiling 15a.

Additionally, an aircraft cabin structure in the form of an aircraft cabin outboard wall 17 is shown positioned adjacent to aircraft cabin assembly 70. As shown in FIG. 7, a single tubular seal 30*a* is shown in position interposed in the gap 72*a* between the aircraft cabin ceiling 15*a* and partition 20. The single (e.g., unitary) tubular seal 30*a* is also shown in position between aircraft cabin outboard wall 17 and partition 20 that is positioned adjacently and perpendicularly to partition 20 positioned, with aircraft cabin outboard wall 17 and partition 20 defining a gap between aircraft cabin outboard wall 17 and partition 20. As shown in FIG. 7, aircraft cabin outboard wall 17 is positioned adjacently and perpendicularly to partition 20. That is, as shown in FIG. 7, a singular tubular seal 30*a* fills a gap between the partition 20 and the aircraft cabin outboard wall 17 and the tubular seal further can be manipulated to bend into a position (e.g., pliably or flexibly bent to "curve" along the partition perimeter) such that a singular tubular seal 30*a* also is interposed within seal gap 72*a* between ceiling 15*a* and partition 20 for the purpose of sealing gap 72*a*.

The use of the presently disclosed tubular seals to seal more than one gap in an aircraft cabin assembly significantly reduces the number of separate parts and/or individual seals otherwise typically required in aircraft cabin assemblies. Incorporating the presently disclosed tubular seals into the manufacture of aircraft cabin assemblies and structures, and aircraft comprising such assemblies and structures, results in a significant and highly advantageous savings of resources in terms of at least: minimization of total parts used in the fabrication of aircraft and aircraft assemblies, manufacturing and inspection manpower hour reduction, overall assembly, structure, and aircraft cost reduction, part inventory design consistency increase, part standardization efficiency increase, part inventory reduction, manufacturing completion time reduction, the potential for overall aircraft weight reduction due at least to fewer total parts (and supporting fasteners, etc.), rework efficiency increase, etc.

The tubular seals disclosed herein provide gap-filling capabilities between first and second aircraft cabin structures having gaps therebetween that are vastly superior to gap-filling capabilities of seals typically used and installed in aircraft cabin assemblies. Such enhanced capabilities include, but are not limited to, superior light-blocking abilities, useful life of the seals themselves, structural integrity of the cabin assemblies (e.g., through the elimination of rattles, etc., due to vibrations, etc.), improved life of the seals and improved life of the sealed aircraft components/assemblies/structures that are positioned adjacent to the tubular seals. The enhanced sealing afforded aircraft cabin assemblies and structures is achieved, at least in part, due to the robustness and resiliency of the present tubular seals (to maintain an outward force during the lifetime of the tubular seals) and the ability of the tubular seals to self-adjust inwardly or outwardly, in real time, to better fill gaps (between aircraft cabin structures) that can change in their gap dimension through useful lifetime of an aircraft and during various aircraft flight phases (e.g., takeoff, landing, pressurization, de-pressurization, etc.) of repeated flights.

FIGS. 8 and 9 are flowcharts generally describing methods according to present aspects. FIG. 8 outlines a method 100 for sealing a gap adjacent an aircraft cabin structure, with the method including installing 102 a first aircraft cabin structure and installing 104 a second aircraft cabin structure into an aircraft cabin, with the second aircraft cabin structure positioned adjacent to and at a selected distance from a first aircraft cabin structure to form a first aircraft cabin structure/second aircraft cabin structure interface. Method 100 further includes interposing 106 a tubular seal between the first and second aircraft cabin structures at the first aircraft cabin structure/second aircraft cabin structure interface. According to present aspects, at least one of the first aircraft cabin structure and second aircraft cabin structure can include the interposed tubular seal, with the tubular seal positioned at (and otherwise interposed between) the first aircraft cabin structure and the second aircraft cabin structure at the first aircraft cabin structure/second aircraft cabin structure interface.

The tubular seal includes a tubular seal wall, with the tubular seal wall defined by a tubular seal wall exterior surface, and a tubular seal wall interior surface. The tubular seal wall interior surface includes a tubular seal wall interior surface profile, with the tubular seal wall interior surface profile defining a tubular seal cavity. The tubular seal wall interior profile includes at least one first wall thickness region, with the first wall thickness region including a first wall thickness, with the tubular seal wall interior profile further including at least one second wall thickness region, and with the second wall thickness region including a second wall thickness. The tubular seal further includes a tubular seal retaining element, with the tubular seal retaining element integral with the tubular seal. The method further includes forming a seal at the first aircraft cabin structure/second aircraft cabin structure interface, wherein the tubular seal wall interior profile includes a pattern of alternating tubular seal wall first interior regions and tubular seal wall second interior regions, with the tubular seal wall first thickness differing from the tubular seal wall second thickness. In another aspect, the tubular seal first wall thickness is greater than the tubular seal second wall thickness.

FIG. 9 outlines a method 110 for sealing a gap adjacent an aircraft cabin structure, with the method including installing 102 a first aircraft cabin structure and installing 104 a second aircraft cabin structure into an aircraft cabin, with the second aircraft cabin structure adjacent to and at a selected distance from a first aircraft cabin structure to form a first aircraft cabin structure/second aircraft cabin structure interface. At least one of the first aircraft cabin structure and second aircraft cabin structure including a tubular seal, with the tubular seal positioned at the first aircraft cabin structure/second aircraft cabin structure interface. Method 110 further includes interposing 106 a tubular seal between the first and second aircraft cabin structures at the first aircraft cabin structure/second aircraft cabin structure interface. According to present aspects, at least one of the first aircraft cabin structure and second aircraft cabin structure can include the interposed tubular seal, with the tubular seal positioned at (and otherwise interposed between) the first aircraft cabin structure and the second aircraft cabin structure at the first aircraft cabin structure/second aircraft cabin structure interface.

The tubular seal wall interior surface includes a tubular seal wall interior surface profile and can comprise a substantially constant radius, with the tubular seal wall interior surface profile defining a tubular seal cavity. The tubular seal wall interior profile includes at least one first wall thickness region, with the first wall thickness region including a first wall thickness, with the tubular seal wall interior profile further including at least one second wall thickness region, and with the second wall thickness region including a second wall thickness. The tubular seal further includes a tubular seal retaining element, with the tubular seal retaining element integral with the tubular seal. The method further includes forming a seal at the first aircraft cabin structure/second aircraft cabin structure interface, wherein the tubular seal wall interior profile includes a pattern of alternating tubular seal wall first interior regions and tubular seal wall second interior regions, with the tubular seal wall first thickness differing from the tubular seal wall second thickness. In another aspect, the tubular seal first wall thickness is greater than the tubular seal second wall thickness. Method 110 further includes maintaining 112 within the tubular seal, an outward force opposing the compressive inward force imposed on the tubular seal by the adjacent first and second aircraft cabin structures.

The methods outlined in FIGS. 8 and 9 are understood to incorporate the tubular seals, aircraft cabin assemblies comprising the tubular seals, and aircraft comprising the aircraft assemblies comprising the tubular seals of the type shown at least in FIGS. 1, 2, 3, 4A, 4B, 5, 6, and 7.

The term "substantially" as used herein means that a particular characteristic, parameter, or value does not need to be exactly achieved. Rather, deviations or variations, including, for example, tolerances, measurement error, measurement accuracy limitations, and other factors known to those skilled in the field, may occur in amounts that do not preclude the effect that the characteristic was intended to provide.

The term "real time": refers to a short period of time, typically a duration of time ranging from about 0.1 to about 1 second, and more preferably from about 0.25 to about 0.5 seconds.

The present aspects may of course, be carried out in other ways than those specifically set forth herein without departing from essential characteristics of the present disclosure. The present aspects are to be considered in all respects as illustrative and not restrictive, and all changes coming within the meaning and equivalency range of the appended claims are intended to be embraced therein.

What is claimed is:

1. An aircraft cabin monument seal comprising:
   a tubular seal comprising an initial dimension, said tubular seal comprising:
      a tubular seal wall, said tubular seal wall defined by a tubular seal wall exterior surface and a tubular seal wall interior surface, said tubular seal wall interior surface comprising a tubular seal wall interior surface profile, said tubular seal wall interior surface profile defining a tubular seal cavity, said tubular seal wall interior surface profile further comprising a tubular seal wall thickness profile, said tubular seal wall thickness profile comprising a plurality of tubular seal wall first thickness regions extending inwardly from the tubular seal wall interior surface into the tubular seal cavity comprising a tubular seal wall first thickness, said tubular seal wall thickness profile further comprising a plurality of tubular seal wall second thickness regions extending inwardly from the tubular seal wall interior surface into the tubular seal cavity comprising a tubular seal wall second thickness;
   wherein said tubular seal wall first thickness is greater than said tubular seal wall second thickness; and
   wherein said tubular seal is configured to dimensionally compress from the initial dimension in the presence of an inwardly compressive force to form a tubular seal in a compressed condition, and said tubular seal further configured to automatically expand outwardly from the compressed condition to an expanded condition in the absence of the inwardly compressive force, said expanded condition comprising an expanded condition dimension substantially similar to the initial dimension.

2. The aircraft cabin monument seal of claim 1, wherein the tubular seal is a removable and reusable tubular seal.

3. The aircraft cabin monument seal of claim 1, wherein said tubular seal wall thickness profile comprises a selected pattern of tubular seal wall first thickness regions and tubular seal wall second thickness regions.

4. The aircraft cabin monument seal of claim 1, wherein said tubular seal wall thickness profile comprises an alternating pattern of tubular seal wall first interior regions and tubular seal wall second interior regions.

5. The aircraft cabin monument seal of claim 1, wherein said tubular seal wall first thickness is greater than the tubular seal wall second thickness by a ratio ranging from 10:1 to 2:1.

6. The aircraft cabin monument seal of claim 1, wherein said tubular seal wall first thickness is greater than the tubular seal wall second thickness by a ratio ranging from 5:1 to 2:1.

7. The aircraft cabin monument seal of claim 1, wherein said tubular seal comprises a variable and radial tubular seal inner wall surface profile, said variable and radial tubular seal inner wall surface profile symmetrical along a vertical axis and is further symmetrical along a horizontal axis.

8. The aircraft cabin monument seal of claim 1, wherein said tubular seal wall exterior surface comprises a substantially constant radius.

9. The aircraft cabin monument seal of claim 1, said tubular seal further comprising:
   a reinforcing insert, said reinforcing insert dimensioned to fit longitudinally within a tubular seal cavity, said reinforcing insert configured to substantially dimensionally match the geometry and dimension of the tubular seal wall interior surface, said reinforcing insert further configured to substantially occupy the volume of the tubular seal cavity.

10. The aircraft cabin monument seal of claim 1, said apparatus further comprising:
    a tubular seal retaining element, said tubular seal retaining element integral with the tubular seal.

11. The aircraft cabin monument seal of claim 10, wherein said tubular seal retaining element is configured to protrude a selected distance from the tubular seal wall exterior surface.

12. The aircraft cabin monument seal of claim 10, wherein said tubular seal retaining element comprises a recessed channel integral with the tubular seal wall exterior surface.

13. The aircraft cabin monument seal of claim 11, further comprising a tubular seal retainer strip configured to receive the tubular seal retaining element.

14. The aircraft cabin monument seal of claim 12, further comprising a tubular seal retainer strip configured to engage the recessed channel.

15. An aircraft cabin assembly comprising;
    a first aircraft cabin structure;
    a second aircraft cabin structure, said second aircraft cabin structure positioned proximate to and positioned a selected distance from the first aircraft cabin structure, said first aircraft cabin structure and said second aircraft cabin structure defining a gap between said first and second aircraft cabin structures;
    a tubular seal comprising an initial dimension, said tubular seal positioned between the first aircraft cabin structure and the second aircraft cabin structure, said tubular seal comprising:
       a tubular seal wall, said tubular seal wall defined by a tubular seal wall exterior surface and a tubular seal wall interior surface, said tubular seal wall interior surface comprising a tubular seal wall interior surface profile, said tubular seal wall interior surface profile defining a tubular seal cavity, said tubular seal wall interior surface profile further comprising a tubular seal wall thickness profile, said tubular seal wall thickness profile comprising a plurality of tubular seal wall first thickness regions extending inwardly from the tubular seal wall interior surface into the tubular seal cavity comprising a tubular seal wall first thickness, said tubular seal wall thickness profile further comprising a plurality of tubular seal wall second thickness regions extending inwardly from the tubular seal wall interior surface into the tubular seal cavity comprising a tubular seal wall second thickness, said tubular seal wall first thickness greater than said tubular seal wall second thickness;

a tubular seal retaining element, said tubular seal retaining element integral with the tubular seal;
a tubular seal retainer strip configured to engage the tubular seal retaining element, said tubular seal retaining element further configured to contact at least one of the first aircraft cabin structure and the second aircraft cabin structure; and wherein said tubular seal is configured to dimensionally compress from the initial dimension in the presence of an inwardly compressive force to form a tubular seal in a compressed condition, and said tubular seal is further configured to automatically expand outwardly from the compressed condition to an expanded condition in the absence of inwardly compressive force, said expanded condition comprising an expanded condition dimension substantially similar to the initial dimension.

16. The aircraft cabin assembly of claim 15, wherein said tubular seal is a one-piece tubular seal.

17. The aircraft cabin assembly of claim 15, wherein said seal wall thickness profile comprises a selected pattern of tubular seal wall first thickness regions and tubular seal wall second thickness regions.

18. The aircraft cabin assembly of claim 15, wherein said tubular seal wall thickness profile comprises an alternating pattern of tubular seal wall first thickness regions and tubular seal wall second thickness regions.

19. The aircraft cabin assembly of claim 15, wherein said tubular seal wall first thickness is greater than the tubular seal wall second thickness by a ratio ranging from 10:1 to 2:1.

20. The aircraft cabin assembly of claim 15, wherein said tubular seal comprises a variable and radial tubular seal wall inner surface profile, said variable and radial tubular seal wall inner surface profile symmetrical along a vertical axis and is further symmetrical along a horizontal axis.

21. The aircraft cabin assembly of claim 15, said tubular seal further comprising:
a reinforcing insert, said reinforcing insert dimensioned to fit longitudinally within the tubular seal cavity, said reinforcing insert configured to substantially dimensionally match the geometry and dimension of the tubular seal wall interior surface, said reinforcing insert further configured to substantially occupy the volume of the tubular seal cavity.

22. The aircraft cabin assembly of claim 15, wherein the tubular seal is a closeout seal.

23. The aircraft cabin assembly of claim 15, wherein the first aircraft cabin structure is at least one of an aircraft cabin floor, an aircraft cabin ceiling, a storage bin, an aircraft cabin monument, an aircraft cabin wall, an aircraft cabin partition, and combinations thereof.

24. The aircraft cabin assembly of claim 15, wherein the second aircraft cabin structure is at least one of an aircraft cabin floor, an aircraft cabin ceiling, a storage bin, an aircraft cabin monument, an aircraft cabin wall, an aircraft cabin partition, and combinations thereof.

25. An aircraft comprising the aircraft cabin assembly of claim 15.

26. A method for sealing a gap formed between two adjacent aircraft cabin structures, the method comprising:
installing a first aircraft cabin structure into an aircraft cabin;
installing a second aircraft cabin structure adjacent to and at a selected distance from a first aircraft cabin structure to form a first aircraft cabin structure/second aircraft cabin structure interface, at least one of said first aircraft cabin structure and said second aircraft cabin structure comprising a tubular seal comprising an initial dimension, said tubular seal positioned at the first aircraft cabin structure/second aircraft cabin structure interface, said tubular seal comprising:
a tubular seal wall said tubular seal wall defined by a tubular seal wall exterior surface, and a tubular seal wall interior surface, said tubular seal wall interior surface comprising a tubular seal wall interior surface profile, said tubular seal wall interior surface profile defining a tubular seal cavity, said tubular seal wall interior surface profile further comprising a tubular seal wall thickness profile, said tubular seal wall thickness profile comprising a plurality of tubular seal wall first thickness regions extending inwardly from the tubular seal wall interior surface profile into the tubular seal cavity comprising a tubular seal wall first thickness, said tubular seal wall thickness profile further comprising a plurality of tubular seal wall second thickness regions extending inwardly from the tubular seal wall interior surface profile into the tubular seal cavity comprising a tubular seal wall second wall thickness, said tubular seal wall first thickness greater than said tubular seal wall second thickness;
a tubular seal retaining element, said tubular seal retaining element integral with the tubular seal;
interposing said tubular seal between the first aircraft cabin
structure and the second aircraft cabin structure to form a seal at the first aircraft cabin structure/second aircraft cabin structure interface;
wherein the tubular seal wall interior surface profile comprises a pattern of alternating tubular seal wall first thickness regions and tubular seal wall second thickness regions; and
wherein said tubular seal is configured to dimensionally compress from the initial dimension in the presence of an inwardly compressive force to form a tubular seal in a compressed condition, and said tubular seal is further configured to automatically expand outwardly from the compressed condition to an expanded condition in the absence of inwardly compressive force, said expanded condition comprising an expanded condition dimension substantially similar to the initial dimension.

27. The method of claim 26, wherein said tubular seal further comprises a variable and radial inner wall surface profile, said variable and radial inner wall surface profile symmetrical along a vertical axis and is further symmetrical along a horizontal axis.

28. The method of claim 26, where the tubular seal wall first thickness is greater than the tubular seal wall second thickness by a ratio ranging from 10:1 to 2:1.

29. The method of claim 26, where the tubular seal wall first thickness is greater than the tubular seal wall second thickness by a ratio ranging from 5:1 to 2:1.

* * * * *